US010733637B1

(12) United States Patent
Singh

(10) Patent No.: US 10,733,637 B1
(45) Date of Patent: Aug. 4, 2020

(54) DYNAMIC PLACEMENT OF ADVERTISEMENTS FOR PRESENTATION IN AN ELECTRONIC DEVICE

(71) Applicant: Amazon Technologies, Inc., Reno, NV (US)

(72) Inventor: Prashant Bhushan Singh, Bihar (IN)

(73) Assignee: Amazon Technologies Inc., Reno, NV (US)

( * ) Notice: Subject to any disclaimer, the term of this patent is extended or adjusted under 35 U.S.C. 154(b) by 1776 days.

(21) Appl. No.: 14/177,098

(22) Filed: Feb. 10, 2014

(51) Int. Cl.
*G06Q 30/02* (2012.01)

(52) U.S. Cl.
CPC .............. *G06Q 30/0277* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,640,580 A | * | 6/1997 | Slayden | G06F 3/0489 715/209 |
| 2011/0283228 A1 | * | 11/2011 | Hiraiwa | G06F 17/30905 715/808 |
| 2012/0056828 A1 | * | 3/2012 | Miyazaki | G06F 3/04883 345/173 |
| 2013/0145306 A1 | * | 6/2013 | Shore | G06F 17/30905 715/781 |
| 2014/0249935 A1 | * | 9/2014 | Daily, IV | G06Q 30/0277 705/14.73 |

OTHER PUBLICATIONS

Bhalla et al., Comparative Study of Various Touchscreen Technologies, Sep. 2010, International Journal of Computer Appications, vol. 6 No. 8, pp. 12-18. (Year: 2010).*

* cited by examiner

*Primary Examiner* — William A Brandenburg
*Assistant Examiner* — Christopher C Busch
(74) *Attorney, Agent, or Firm* — Hogan Lovells US LLP

(57) ABSTRACT

A computer-implemented method for dynamic advertisement placement in an application of an electronic device, under control of one or more computer systems configured with executable instructions, includes obtaining coordinate information for a touch location that corresponds to a place where a user touches a display area of an application to provide input to the application. The method also includes receiving one or more advertisements that is contextually relevant to the application. The method includes determining a size and a position of the preview window based at least in part on the coordinate information of the touch location and an amount of available area within the display area of the application surrounding the touch location. The method also includes providing for display the preview window in the determined size at a location corresponding to the determined position around the touch location with the preview window containing the one or more advertisements.

20 Claims, 11 Drawing Sheets

DYNAMIC PLACEMENT OF ADVERTISEMENTS FOR PRESENTATION IN AN ELECTRONIC DEVICE

BACKGROUND

As the number of users viewing information and purchasing items electronically increases, there is a corresponding increase in the amount of advertising revenue spent in electronic environments. In some cases, advertisements are targeted to specific users or to specific web pages or other interfaces to be displayed to users. Advertisements also may be selected based on the content displayed on any number different pages displayed to a user or may also be selected based on search information, such as keywords, entered into a search engine as a user searches for content.

Often, the advertisement includes a hypertext link or other user-selectable element that enables the user to navigate to another page or display relating to the advertisement. The page or display relating to the advertisement may provide the user with the ability to purchase the products or services offered by the advertiser either directly from the advertiser or from a provider of the site. Advertisers hope to generate sales by purchasing sponsored advertisements for display to users most likely to be interested in purchasing the products or services that the advertiser is offering. A provider of a site, such as an ecommerce website, may offer for sale a number of similar, competing products or services, and the provider may display advertisements interesting to users that, when selected by a user, lead the user to the related product or service being offered for sale by the site provider.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to presenting advertisements associated with an advertiser and/or provider of a site. In particular, various embodiments provide advertisements to be displayed to a user that are related to the context of an application running on an electronic computing device. In this regard, the advertisements displayed to the user may include content relating to physical items and/or digital items that are determined to be at least somewhat contextually relevant to the application, and are selectively displayed on an electronic computing device based on several characteristics of the electronic computing device including, but not limited to, the available area (or resolution) in the electronic computing device, the coordinates of a user touch location on the electronic computing device screen (or display), the orientation of the electronic computing device, and the density of the electronic computing device screen (or display).

In at least some embodiments, a computer-implemented method for dynamic advertisement placement in an application of an electronic device, under control of one or more computer systems configured with executable instructions, includes obtaining coordinate information for a touch location that corresponds to a place where a user touches a display area of an application to provide input to the application. The method also includes receiving one or more advertisements that is contextually relevant to the application. The method includes determining a size and a position of the preview window based at least in part on the coordinate information of the touch location and an amount of available area within the display area of the application surrounding the touch location. The method also includes providing for display the preview window in the determined size at a location corresponding to the determined position around the touch location with the preview window containing the one or more advertisements.

Figure 1:
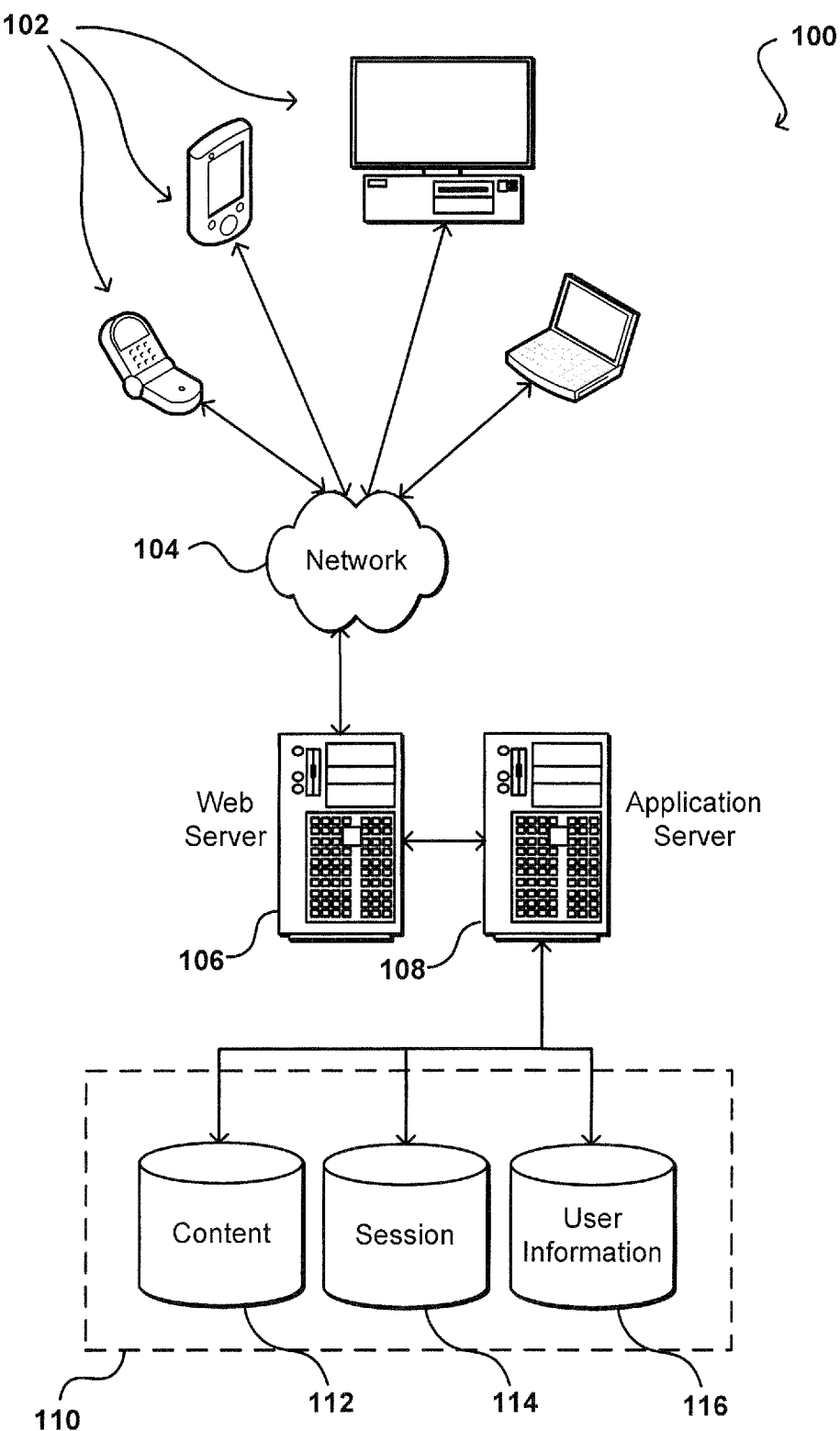
FIG. 1 illustrates an example of an environment for implementing aspects in accordance with various embodiments.

Different approaches can be implemented in various environments in accordance with the described embodiments. For example, FIG. 1 illustrates an example of an environment 100 for implementing aspects in accordance with various embodiments. As will be appreciated, although a Web-based environment is used for purposes of explanation, different environments may be used, as appropriate, to implement various embodiments. The system includes an electronic client device 102, which can include any appropriate device operable to send and receive requests, messages or information over an appropriate network 104 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 106 for receiving requests and serving content in response thereto, although for other networks an alternative device serving a similar purpose could be used, as would be apparent to one of ordinary skill in the art.

The illustrative environment includes at least one application server 108 and a data store 110. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 102 and the application server 108, can be handled by the Web server 106. It should be understood that the Web and application servers are not required and are merely example components, as structured code discussed herein can be executed on any appropriate device or host machine as discussed elsewhere herein.

The data store 110 can include several separate data tables, databases or other data storage mechanisms and media for storing data relating to a particular aspect. For example, the data store illustrated includes mechanisms for storing production data 112 and user information 116, which can be used to serve content for the production side. The data store also is shown to include a mechanism for storing log or session data 114. It should be understood that there can be many other aspects that may need to be stored in the data store, such as page image information and access rights information, which can be stored in any of the above listed mechanisms as appropriate or in additional mechanisms in the data store 110. The data store 110 is operable, through logic associated therewith, to receive instructions from the application server 108 and obtain, update or otherwise process data in response thereto. In one example, a user might submit a search request for a certain type of element. In this case, the data store might access the user information to verify the identity of the user and can access the catalog detail information to obtain information about elements of that type. The information can then be returned to the user, such as in a results listing on a Web page that the user is able to view via a browser on the user device 102. Information for a particular element of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature and not limiting to the scope of the disclosure.

Figure 2:
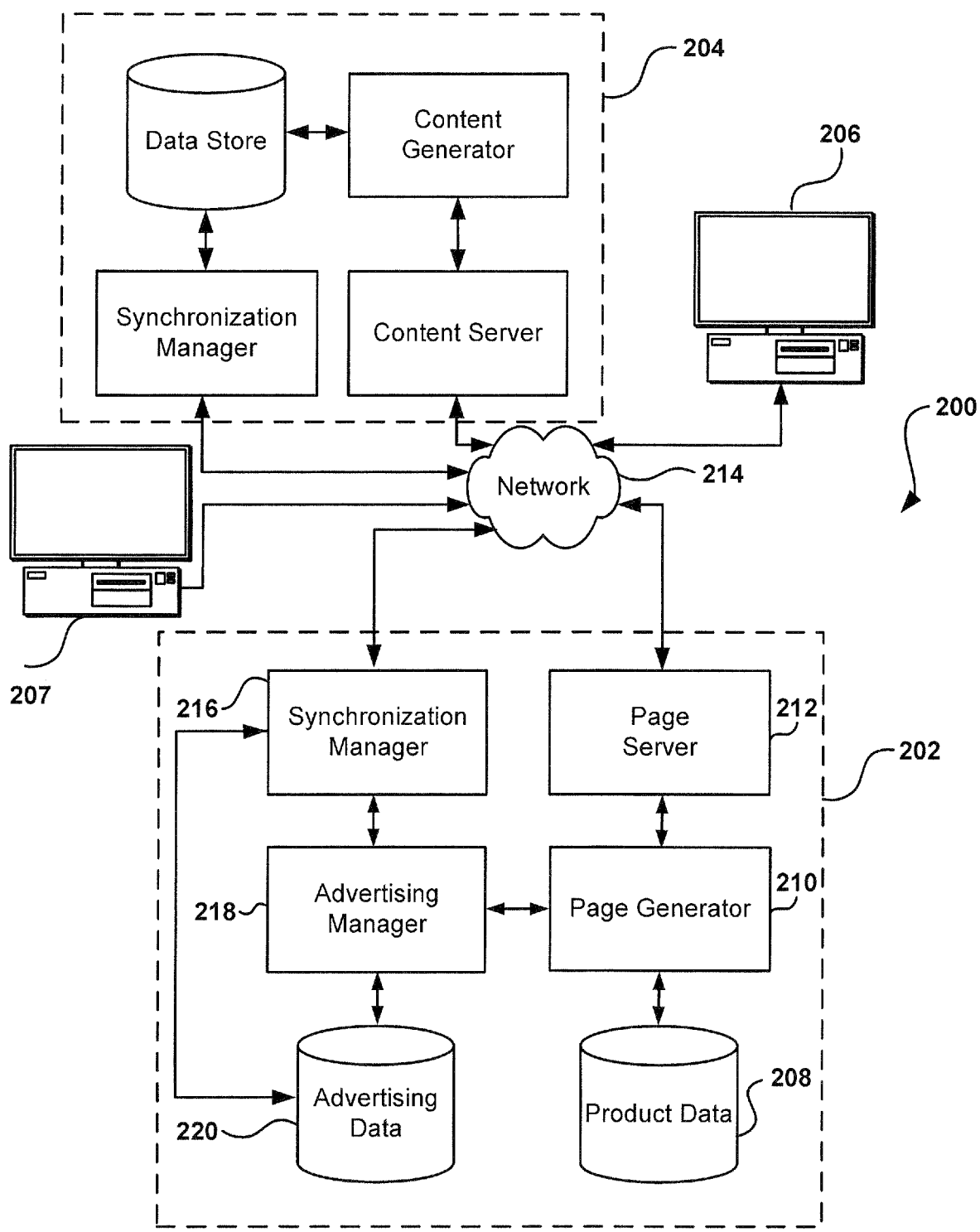
FIG. 2 illustrates an example configuration for providing dynamic advertisements in accordance with one or more embodiments.

As discussed above, in one embodiment an advertising entity is configured to advertise on other sites or with other providers, such as, for example, a Web site operator or a content provider. FIG. 2 illustrates an example configuration 200 for providing dynamic advertisements in accordance with one or more embodiments. The environment 100 in such cases might include additional components and/or other arrangements, such as those illustrated in the configuration 200 of FIG. 2.

In this example, components for an advertising entity 202 can generate advertising associations such as keywords and related advertisements, as well as advertisements and related landing pages. While the advertising components in this example are shown to be part of the advertising entity's system, it should be understood that these components can be part of a separate system or provided as a third party service, for example, an external advertising entity. Thus, in one embodiment, keywords may be provided to the advertising entity 202, which would then forward them to an external advertising entity (not shown) and in response receive advertisements associated with the provided keywords.

In this example, the advertising entity 202 may also generate and serve pages of content related to advertisements that are made available to a viewer of content 206, and thus can include components such as a production data store 208 that can be used by a page generator 210 to generate pages that can be served by a page server 212 (such as a Web server in a Web-based environment) over a network 214 to the viewer's computing device 206. Similarly, the content provider 204 can include components such as page generator and page server components for generating and serving pages of content to a viewer. While many of the embodiments are described with respect to a Web-based environment, it should be understood that pages are not limited to Web pages, but can include any application page or other interface page that can be displayed or otherwise conveyed to a viewer.

In the example of FIG. 2, the advertising entity system includes an advertising manager 218, which can include any combination of devices and/or processes operable to encompass, monitor, and/or control a number of different algorithms and components for selecting advertisements associated with submitted keywords. The manager 218 may be also include components configured to select landing pages related to advertisements, as well as to dynamically determine categories for each selected landing page. When the advertising manager 218 decides on a landing page, category, and/or other such information, the advertising manager 218 can store the advertising data to an advertising data store 220, which in some embodiments can comprise separate product data in the product data store 208. Portions of this data alternatively can be stored and/or accessed from other appropriate storage devices of the system and/or across the network.

The advertising entity 202 also can include a synchronization manager 216 that can periodically synchronize the advertising data stored at the data store 220 with product data 208, such that the appropriate landing pages, creative content, and financial information can be designated and updated as desired. Thus, in operation, a viewer using the computing device 206 may be directed by a Web site operator 207 (e.g., by clicking on a blog post owned by the Web site operator 207) to view the content served by the content provider 204. Upon selection by the viewer, an advertisement can be displayed that will direct the viewer to a related product page served by the advertising entity 202.

An example technique for determining a selective size and location of advertisements (e.g., dynamic ad unit) to be displayed upon a user's touch location inside a native application of an electronic device (e.g., viewer's computing device 206), in accordance with one embodiment, will now be described. The illustrative technique creates a dynamic advertisement unit (sometimes referred to as a "preview pop-over") that can be displayed on a mobile device, such as a smartphone device or tablet computing device, and dynamically determines the dimensions and placement of the preview pop-over on a screen of the viewer's computing device 206.

Figure 3A:
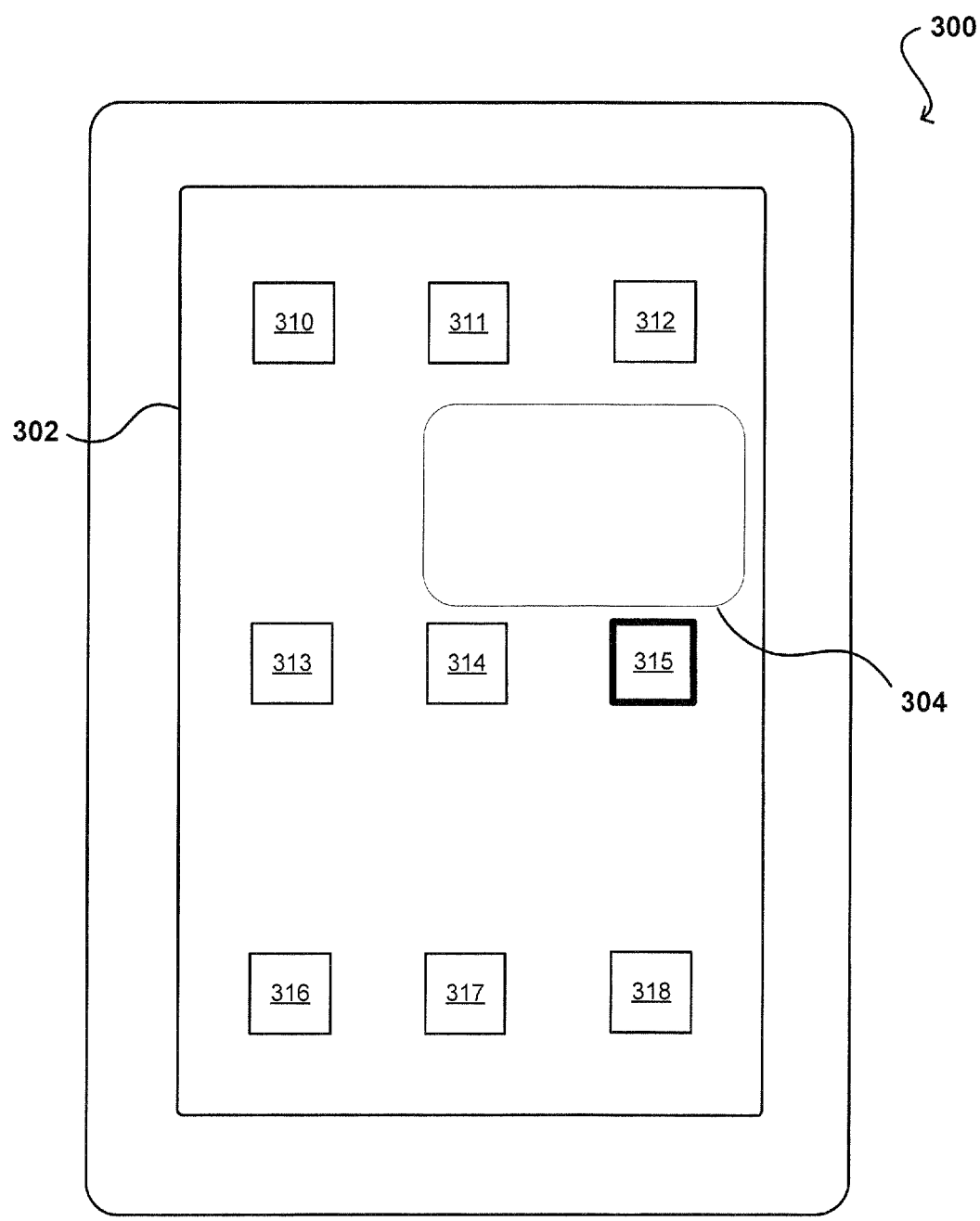
FIGS. 3A-3D illustrate examples of a dynamic advertisement placement process on an electronic user device in accordance with one or more embodiments.

FIGS. 3A-3D illustrate examples of a dynamic advertisement placement process on an electronic user device 300 in accordance with one or more embodiments. Referring to FIG. 3A, the electronic user device 300 includes a display area 302 that is configured to display selection elements 310-318 and preview window 304. In some aspects, the display area 302 includes an overlay (not shown) with the preview window 304 being presented on the overlay. The electronic user device 300 may be configured to run a native or web-based application (e.g., an e-commerce portal, a game, a utility and the like), and advertisements having a contextual relation to the application can be dynamically fetched such that the advertisements can be presented with a selective size at a selective location within the application based on multiple display characteristics of the electronic user device 300. For example, an application directed to fitness may include advertisements containing content that relates to fitness and/or goods related to fitness. Such display characteristics may include, but are not limited to, the available area (or resolution) in the display area 302, the coordinates of a user touch location with respect to one of the selection elements 310-318, the orientation of the electronic user device 300 (e.g., portrait orientation or landscape orientation), and the density of the display area 302.

The display area 302 may include a panel containing the selection elements 310-318 along with display information relating to the electronic user device 300 (e.g., notifications, title, and the like). In some aspects, the display area 302 includes multiple panels with the selection elements 310-318 and the display information being provided on respective panels. In this regard, display coordinates of an outermost panel, if multiple panels are provided, can be obtained to determine at least the resolution and/or density of the display area 302. In some aspects, the resolution and/or density of the display area 302 may be predefined by a supplier (e.g., at time of manufacturing) or dynamically measured using one or more sensors included in the electronic user device 300.

The selection elements 310-318 are configured to receive a respective user input based on a user touch on the display area 302. In this regard, the touch location may correspond to a selection of one of the selection elements 310-318 by the user in the form of an input gesture. The input gesture may include a single-tap, a double-tap, a leftward or rightward swipe, a continuous contact for a specified duration, or the like. In turn, coordinate information of the touch location on the display area 302 can be obtained, and thereafter compared with the coordinates of the display area 302 to determine one or more display metrics (e.g., amount of available area and/or density of the display area 302). The coordinate information may include two-dimensional data (e.g., x-axis coordinates, y-axis coordinates) and/or pixel data (e.g., pixel-by-pixel coordinates) that is indicative of the location of the touch location.

In some aspects, the touch location corresponds to a location of one of the selection elements 310-318. In this regard, the corresponding selection element is identified (e.g., selection element 315), and content associated with a service can be received in response to the user input via the corresponding selection element. In turn, a preview window 304 containing the content associated with the service can be generated. The content may include one or more advertisements having contextually relevant goods and/or items associated with the application. For example, the advertisement may include an image of a product for sale, a brief description of the product, a price for the product, a rating for the product including a link to customer reviews, a hyperlink to initiate the purchase transaction, and/or an identifier of the provider of the site (e.g., company logo). The preview window 304 may be configured to display a minimum amount of content (or advertisements) based on a placement and/or dimensions of the preview window 304. The advertisements may be received concurrently with content of the application, may be obtained independently from the content of the application, may be retrieved from a remote storage device and/or a network cloud, may be pushed by a remote network to the electronic user device 300 on a periodic or aperiodic basis, or may be retrieved from a local storage device on a fixed schedule or dynamically fetched. The service may be related to a service provider, an advertiser, or a provider of a site (e.g., e-commerce supplier).

In turn, the placement and dimensions for the preview window 304 may be determined based at least in part on the coordinate information of the touch location. Given that selection element 315 is identified as being selected by the user, there are four possible locations around the selection element 315 (or touch location) where the preview window 304 can be presented, such as above the selection element 315, right of the selection element 315, below the selection element 315, and left of the selection element 315. In some aspects, the preview window 304 is generated at each of the possible locations in a specified sequence (e.g., first is above, second is to the right, third is below, and fourth is to the left). The preview window may be displayed over one or more selection elements located proximate to the selection element 315 such that the other selection elements may be entirely, if not at least in part, obscured from view.

The selective size and location of the preview window 304 is based on whether the preview window 304 can be displayed with a maximum size possible within the area available around the touch location. The coordinates of the display area 302 can be compared with the coordinates of the touch location to determine the amount of area available around the touch location. In some aspects, the coordinates of the display area 302 may define the edges of the outermost panel of the application by providing the number of pixels across an x-axis versus the number of pixels across a y-axis (orthogonal to the x-axis). For example, the amount of available area above the selection element 315 is greater than the amount of available area right of the selection element 315, and the amount of available area below and left of the selection element 315 are comparable to the amount of available area above the selection element 315.

The preview window 304 may be initially set with a maximum area of 400×250 dip (density independent pixels), for example. The maximum area may be predefined by a user (via user preferences) or manufacturer (at time of manufacturing). The maximum area may be used to determine the possible locations around the touch location capable of presenting the preview window 304 with the largest size possible. The preview window 304 having its size set to the maximum area may be compared to the amount of available area of each possible location. In this regard, if the area of the preview window 304 is greater than the amount of available area of a respective location, the size of the preview window 304 for that respective location is adjusted downward such that the size (e.g., height and width) is decreased proportionate with the amount of available area. For example, if the preview window 304 (set to 400×250 dpi) is greater than the available area for the location above the selection element 315, which may be set to 300×175 dpi, then the width of the preview window 304 can be adjusted from 400 to 300 or lower, and the height can be adjusted from 250 to 175 or lower. Alternatively, if the amount of available area located above the selection element 315 is greater than 400×250 dpi, for example, then the size of the preview window 304 can remain at the maximum area since there is sufficient area capable of presenting the preview window 304. In some aspects, the aspect ratio of the preview window 304 remains constant during the size adjustment (e.g., when the preview window is reduced from the maximum size to an adjusted size).

In some aspects, the preview window 304 is centrally aligned with respect to the selection element 315. In this regard, the preview window 304 is positioned such that the selection element 315 is aligned with a midpoint (or central location) of an edge of the preview window 304 that faces the selection element 315. Alternatively, the location of the preview window 304 with respect to the selection element 315 is adjusted when the preview window 304 set to the maximum area (or adjusted area) would extend beyond the outermost panel of the application. For example, if the preview window when centrally-aligned with the selection element is determined not to fit within a specified available area (e.g., above element), then the preview window can be adjusted horizontally or vertically depending on implementation. In this regard, the preview window 304 is realigned with the selection element 315 by a specified amount (e.g., to the left) such that the preview window 304 is positioned adjacent to a specified edge of the display area 302. For example, the preview window 304 may be abutted to a right edge of the display area 302 with the preview window 304 being located above and right-aligned with the selection element 315.

In some aspects, the preview window 304, after adjustments to the size and position as discussed above, can be provided for display at a location corresponding to the determined placement around the touch location. In this example, the preview window 304 is presented above the selection element 315 with its size set to the maximum area but with its alignment with respect to the selection element 315 having been adjusted to the left. As will be discussed in further detail below, the preview window 304 is generated and can be adjusted accordingly for each of the possible locations, and one of the preview windows 304 is selected as having the selective size and location.

Figure 3B:
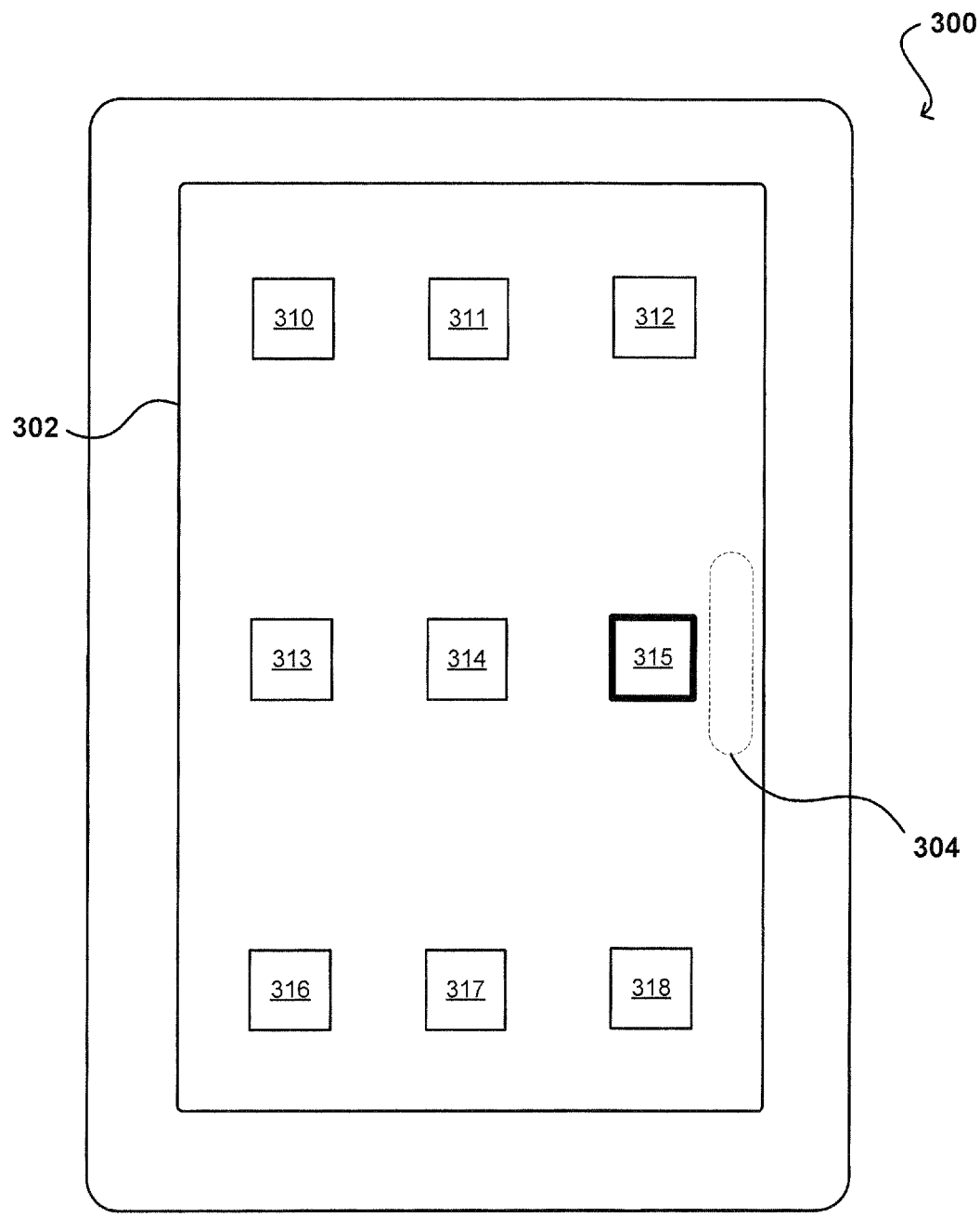

Referring to FIG. 3B, the electronic user device 300 includes the display area 302 with the selection element 315 selected by a user. Next in the specified sequence as described above is to the right of the selection element 315. The amount of available area to the right of the selection element 315 may be determined to be smaller than the amount of available area above the selection element 315. In this regard, the size of the preview window 304 may need to be adjusted to fit within the location that is to the right of the selection element 315. However, the available area to the right of the selection element 315 may be insufficient to allow the preview window 304 to be presented at this location. In some aspects, the preview window 304 is initially set to a predefined size (or dimensions), and that size is compared with the amount of available area of the specified location. The amount of available area at the specified location may need to satisfy a minimum threshold to make the display of the preview window 304 practical. The minimum threshold may correspond to a pixel-by-pixel value allowable to display a minimum amount of content within the preview window 304. In this regard, the available area to the right of selection element 315 may not satisfy the minimum threshold. As such, the location to the right of the selection element 315 may not be used as a possible location by the electronic user device 300.

Figure 3C:
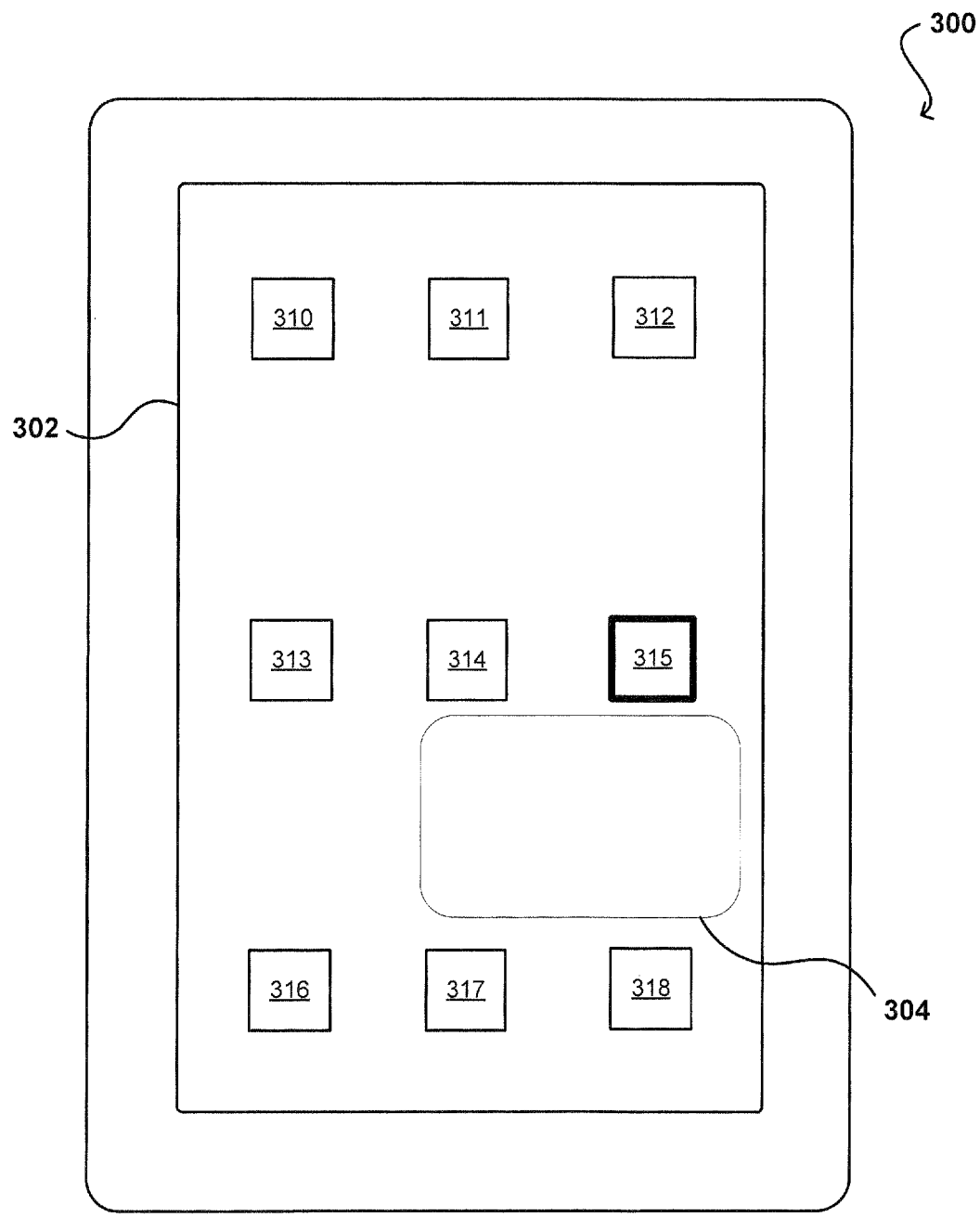

Referring to FIG. 3C, the electronic user device 300 includes the display area 302 with the selection element 315 selected by the user. Next in the specified sequence as described above is below the selection element 315. With the preview window 304 set to the maximum area, the size of the preview window 304 is compared with the amount of available area corresponding to the location below the selection element 315. If the size of the preview window 304 at the maximum size is greater than the amount of available area, then the size of the preview window 304 can be adjusted downward. Otherwise, the preview window 304 is kept at the maximum area, and the positioning of the preview window 304 with respect to the selection element 315 can be determined. In this regard, the preview window 304 cannot be centrally aligned with the selection element 315 without extending beyond the outermost panel of the display area 302. Similarly to the positioning as described in FIG. 3A, the preview window 304 is readjusted to the left, and the preview window 304 can be right-aligned with the selection element 315. The preview window 304 generated at the location below the selection element 315 becomes a candidate preview window, and its selection can be determined after the preview window at the final possible location is generated.

Figure 3D:
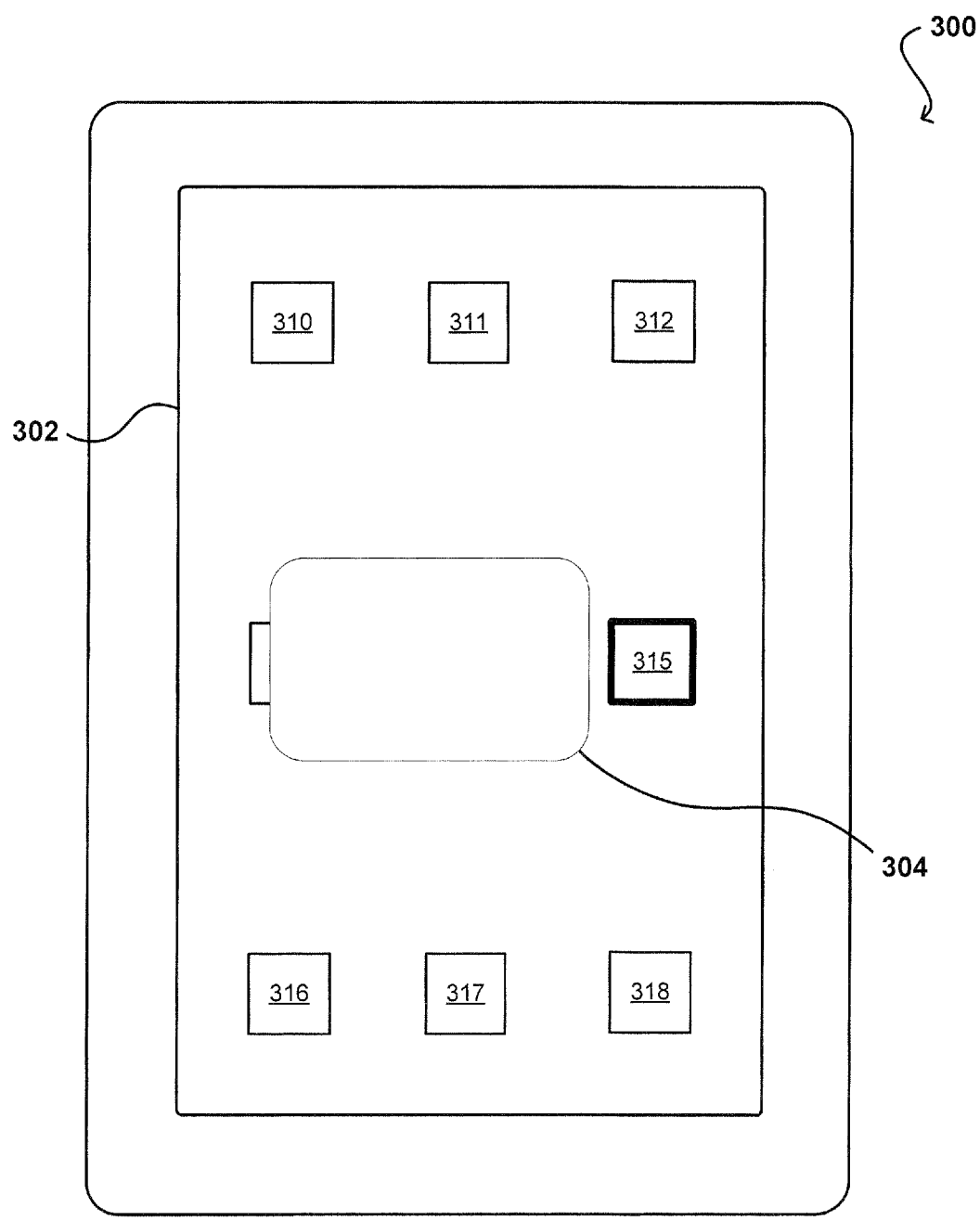

Referring to FIG. 3D, the electronic user device 300 includes the display area 302 with the selection element 315 selected by the user. Next in the specified sequence as described above is below the selection element 315. With the preview window 304 set to the maximum area, the size of the preview window 304 is compared with the amount of available area corresponding to the location to the left of the selection element 315. If the size of the preview window 304 at the maximum size is greater than the amount of available area, then the size of the preview window 304 can be adjusted downward. Otherwise, the preview window 304 is kept at the maximum area, and the positioning of the preview window 304 with respect to the selection element 315 can be determined. In this regard, the preview window 304 is centrally aligned with the selection element 315 since the preview window 304 does not extend beyond the outermost panel of the display area 302 when set to the maximum dimensions (or adjusted dimensions). The preview window 304 generated at the location that is to the left of the selection element 315 becomes another candidate preview window.

In some aspects, the preview window having the maximum dimensions is selected as the representative preview window. Alternatively, if more than one preview window has the same maximum dimensions (or equivalent specified size), then one of candidate preview windows is selected based on a specified sequence. In some aspects, the specified sequence includes top (or above), right, bottom (or below), and left. In this regard, since the preview window 304 of FIGS. 3A, 3C and 3D had the same maximum dimensions, all three preview windows are candidate preview windows. As such, the preview window of FIG. 3A, which is located above the selection element 315, is selected as the representative preview window based on the specified sequence (e.g., the top or above location is first in the sequence). In some implementations, the selected preview window is added to the user interface of the application to be provided for display to the user. The remaining candidate preview windows may be discarded (or removed from a local or remote memory).

The preview window 304 may include an indicator such as an arrowhead based on the location of the preview window 304 and an edge location of the selection element 315. The location and direction of the arrowhead (or indicator) may be based at least in part on the position of the preview window 304 with respect to the selection element 315 (e.g., above, right, below, left), the coordinates of the selection element 315, the location of the nearest edge of the selection element 315 based on the position of the preview window 304, and location of a midpoint (or central location) of the nearest edge of the selection element 315. In turn, the indicator may be placed at a location on an edge of the preview window 304 that corresponds to the central location of the nearest edge of the selection element 315. For example, the arrowhead may be positioned on a far-right edge of the preview window 304 (e.g., when the preview window 304 is located above the selection element 315 and the selection element 315 is located adjacent to the right edge of the display area 302) but directly facing the central location of the nearest edge of the selection element 315.

Figure 4A:
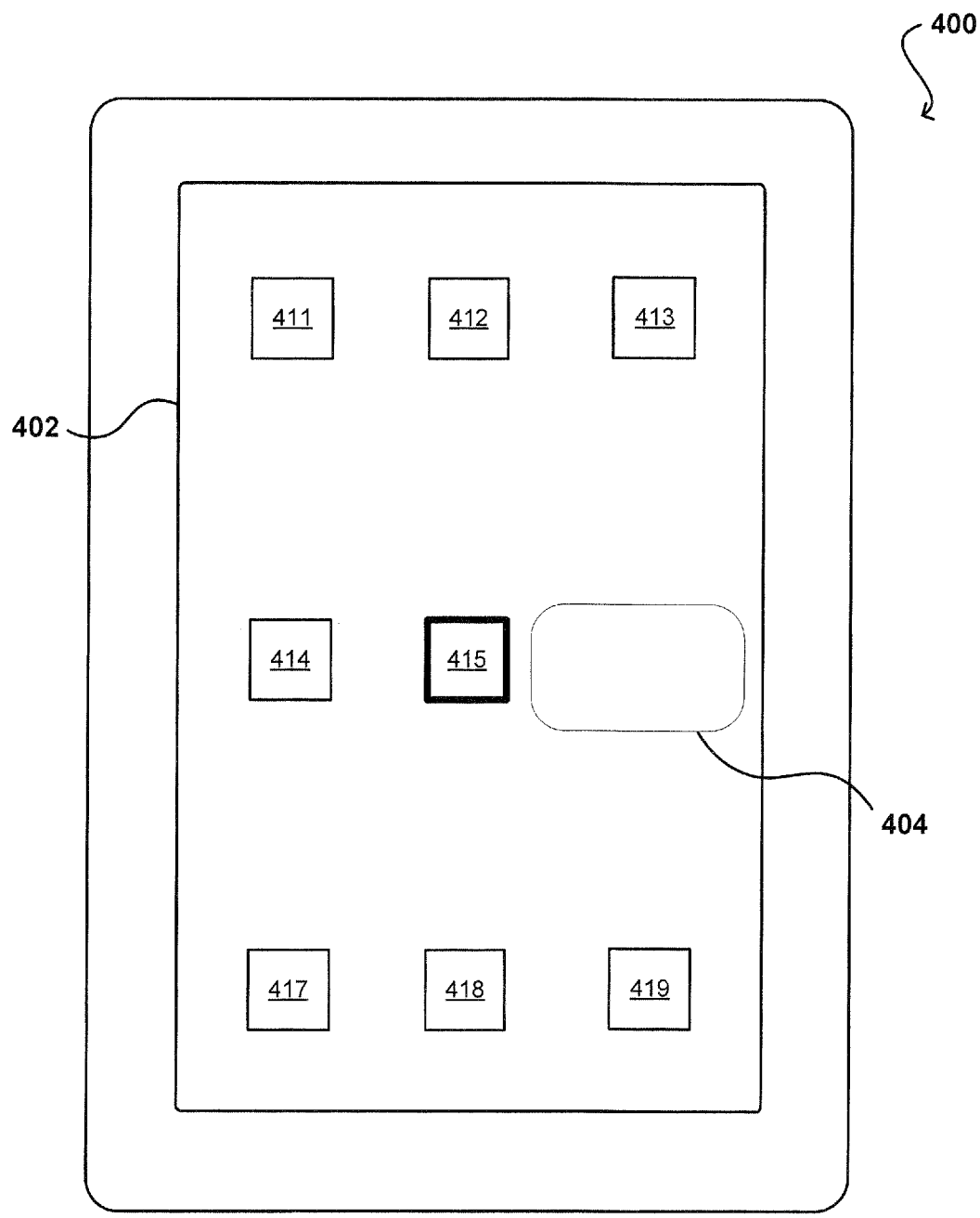
FIGS. 4A-4B illustrate examples of a dynamic advertisement placement on respective orientations of an electronic user device in accordance with one or more embodiments.
Figure 4B:
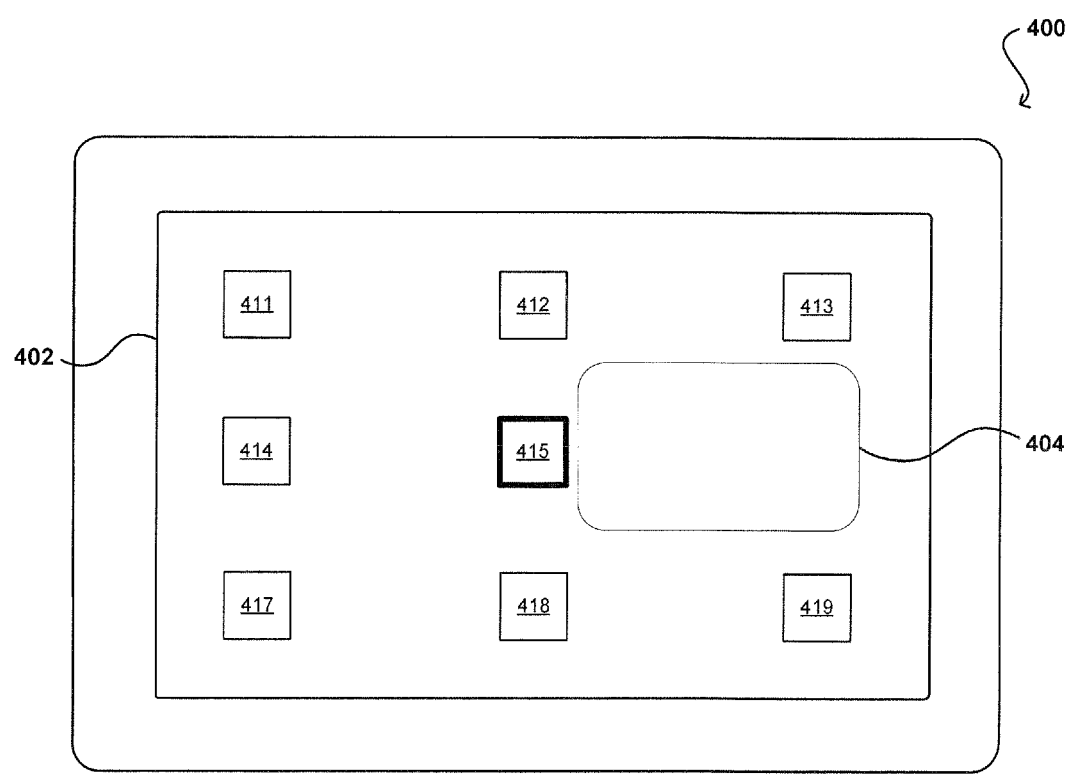

FIGS. 4A-4B illustrate examples of a dynamic advertisement placement on respective orientations of an electronic user device 400 in accordance with one or more embodiments. Referring to FIG. 4A, the electronic user device 400 includes a display area 402 having selection elements 411-418 presented therein. The electronic user device 400 is configured in a portrait orientation, and selection of the selection element 415 by a user causes a preview window 404 to be displayed on the display area 402. In this regard, the placement and size of the preview window 404 will be based at least in part on the portrait orientation of the electronic user device 400. In this example, the preview window 404 has been generated for a location to the right of the selection element 415. As such, the dimensions of the preview window 404 are decreased to conform to the available area when the preview window 404, having been set to the maximum area (or dimensions), is determined to be greater than the amount of available area in the location to the right of the selection element 415. In addition, the aspect ratio of the preview window 404 may be kept constant when the preview window 404 is reduced in size. In some aspects, one or more descriptions may be selectively provided depending on the adjusted size of the preview window 404. In this example, a subset of content made available for display on a maximum-sized preview window may be provided for display such that only an image of a product for sale, a brief description of the product (e.g., a title) and a corresponding price for the product can be displayed within the reduced-sized preview window 404, for example. In some implementations, if the amount of available area is greater than a specified size of the preview window 404, then the preview window 404 may be enlarged proportionately to include additional content (e.g., product ratings, company logo, or link to portal for initiating purchase transaction).

Referring to FIG. 4B, the electronic user device 400 includes the display area 402 having selection elements 411-418 presented therein. The electronic user device 400 is configured in a landscape orientation, and the amount of available area in the location to the right of the selection element 415 is different than the amount of available area as discussed in FIG. 4A. As such, the size of the preview window 404 can be maintained at the maximum dimensions since the available area is sufficient to support the larger sized preview window 404. In this respect, the placement and size of the preview window 404 may differ depending on the orientation of the electronic user device 400.

Figure 5:
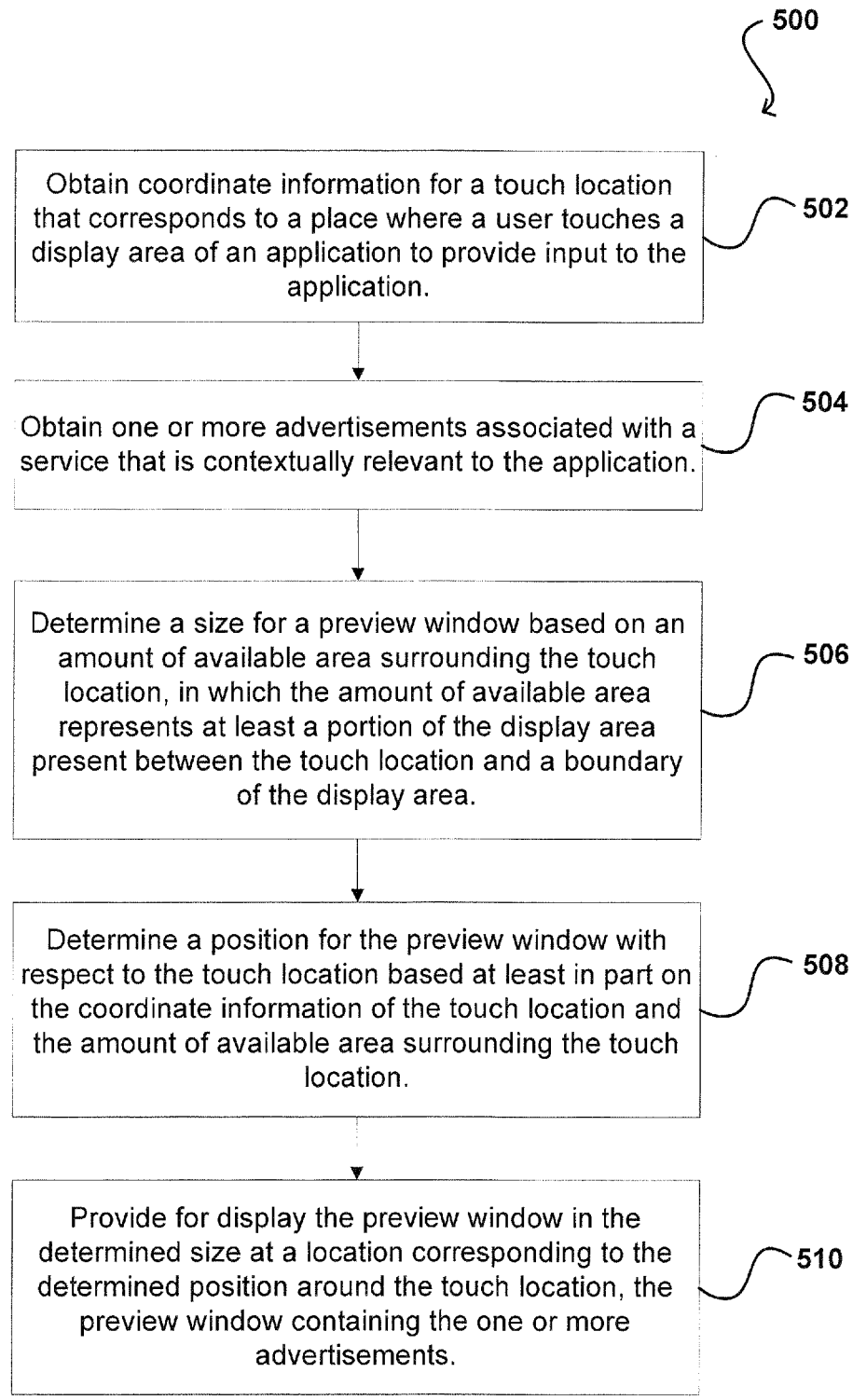
FIG. 5 illustrates a method for dynamic advertisement placement in accordance with one or more embodiments.

FIG. 5 illustrates a method 500 for dynamic placement of advertisements for presentation in an application of an electronic device in accordance with one or more embodiments. It should be understood that there can be additional, fewer, or alternative steps performed in similar or alternative orders, or in parallel, within the scope of the various embodiments unless otherwise stated.

The method 500 may be a computer-implemented method that under control of one or more computer systems configured with executable instructions can perform operations that include process 502 for obtaining coordinate information for a touch location, in which the touch location corresponds to a place where a user touches a display area of an application to provide input to the application. The operations also include process 504 for receiving one or more advertisements that are contextually relevant to the application. The operations also include process 506 for determining a size of the preview window based on an amount of available area surrounding the touch location. The amount of available area may represent at least a portion of the display area present between the touch location and a boundary (or edge) of the display area. In addition, the operations include process 508 for determining a position of the preview window with respect to the touch location based at least in part on the coordinate information of the touch location and the amount of available area surrounding the touch location. Further, the operations include process 510 for providing for display the preview window in the determined size at a location corresponding to the determined position around the touch location, in which the preview window contains the one or more advertisements.

In some aspects, the process for determining the size of the preview window includes receiving coordinate information of the display area and comparing the coordinate information of the touch location with the coordinate information of the display area to determine a difference in area for different locations around the touch location. In turn, the size of the preview window for each of the different locations around the touch location can be determined based at least in part on respective differences in area.

In at least some embodiments, the process for determining the position of the preview window includes determining multiple available locations around the touch location and determining the amount of available area at each of the available locations. In turn, one of the available locations can be selected when the amount of available area at one of the available locations is determined to be greater than the amount of available area at the remaining available locations. In some aspects, the preview window is provided for display at the selected location.

Figure 6:
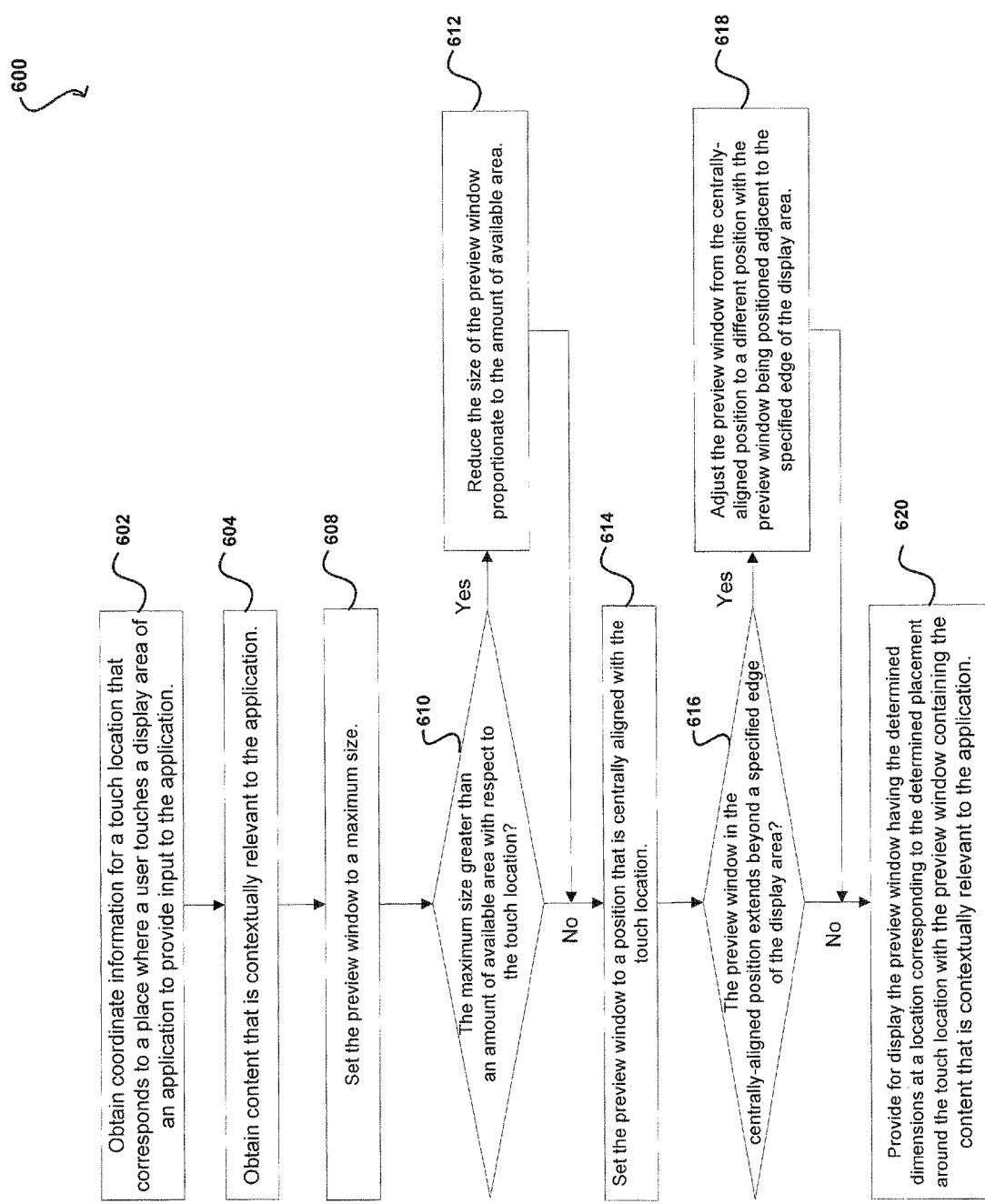
FIG. 6 illustrates a method for dynamic advertisement placement in accordance with one or more embodiments.

FIG. 6 illustrates a method 600 for dynamic advertisement placement in accordance with one or more embodiments. It should be understood that there can be additional, fewer, or alternative steps performed in similar or alternative orders, or in parallel, within the scope of the various embodiments unless otherwise stated.

The method 600 may be a computer-implemented method that under control of one or more computer systems configured with executable instructions can perform operations that include process 602 for obtaining coordinate information of a touch location on a display area of the application, in which the touch location is associated with a user input. Given the association, the touch location may correspond to a location of a selection element of the application that is configured to receive the user input. The operations may include process 604 for obtaining content that is contextually relevant to the application. In turn, the method 600 may include a process for determining placement and dimensions for a preview window configured to contain the content. Placement and dimensions for the preview window can be determined based at least in part on the coordinate information of the touch location. In some aspects, determining the placement for the preview window includes comparing the coordinate information of the touch location with one or more edges of the display area. In this respect, the placement and dimensions for the preview window may be determined based on an amount of available area within the display area of the application. The amount of available area may represent at least a portion of the display area present between the touch location and a boundary (or edge) of the display area. In addition, the placement and dimensions for the preview window are determined based on an orientation of the electronic device (e.g., portrait orientation or landscape orientation). The placement and dimensions for the preview window also may be determined based on a density of the display area of the application.

In some implementations, determining the dimensions for the preview window includes process 608 for setting the preview window to a maximum size. For example, the maximum size may be a predefined value based on a number of density independent pixels (dip). At process 610, the size of the preview window, which is set to the maximum area, is compared to the amount of available area. At process 612, the size of the preview window may be reduced proportionately to the amount of available area when the maximum size is determined to be greater than the amount of available area. The aspect ratio of the preview window may be kept constant when the preview window is decreased in size. In some aspects, if the amount of available area is greater than a specified size of the preview window 404, then the preview window 404 may be enlarged proportionately to include additional content (e.g., product ratings, company logo, or link to portal for initiating purchase transaction).

At process 614, the preview window may be set at a position that is centrally aligned with the touch location. At process 616, the method 600 includes determining if at least a portion of the preview window in the centrally-aligned position extends beyond a specified edge of the display area. At process 618, when the at least a portion of the preview window at the centrally-aligned position is determined to extend beyond the specified edge of the display area, the preview window is adjusted from the centrally-aligned position to a different position with the preview window being positioned adjacent to the specified edge of the display area.

At process 620, the preview window having the determined dimensions can be provided for display at a location corresponding to the determined placement around the touch location with the preview window containing the content that is contextually relevant to the application. In providing for display the preview window, an overlay that includes the preview window can be provided for display. In this respect, the overlay may be presented over the application such that the underlying components (e.g., selection elements 310-318 of FIG. 3A) are disabled (or non-selectable). For example, the overlay may include a specified amount of transparency such that the underlying components appear shadowed (or partially obscured). In addition, the preview window may be displayed over the overlay such that the content is fully visible.

In some aspects, the method 600 may include process for determining an amount of available area for multiple locations around the touch location and determining a preview window for respective locations with each of the preview windows having a specified size up to the amount of available area in the respective location. In turn, one of the preview windows having a specified size that is greater than the specified size of the preview windows of the remaining locations can be selected as the representative preview window. In some implementations, multiple preview windows may have the same maximum dimensions (or specified size). As such, one of the preview windows may be selected in a specified sequence of positions with respect to the touch location (e.g., top (or above), right, below (or bottom) and left) when more than one of the preview windows are equivalent in size, and are greater than the specified size of the preview windows at the remaining locations. In turn, the selected preview window is provided for display.

In at least some embodiments, the selected preview window includes an indicator at an edge of the preview window that is adjacent to the touch location. For example, the indicator may be positioned on an edge of the preview window that is nearest to an edge of a selection element. The indicator may be generated based on the location of the preview window with respect to the nearest edge of the selection element included in the touch location. For example, the indicator may be an arrowhead that points in the direction of the nearest edge of the selection element with the arrowhead positioned at a location on the edge of the preview window that corresponds to a midpoint of the nearest edge of the selection element (e.g., the edge of the selection element that faces the preview window).

Figure 7:
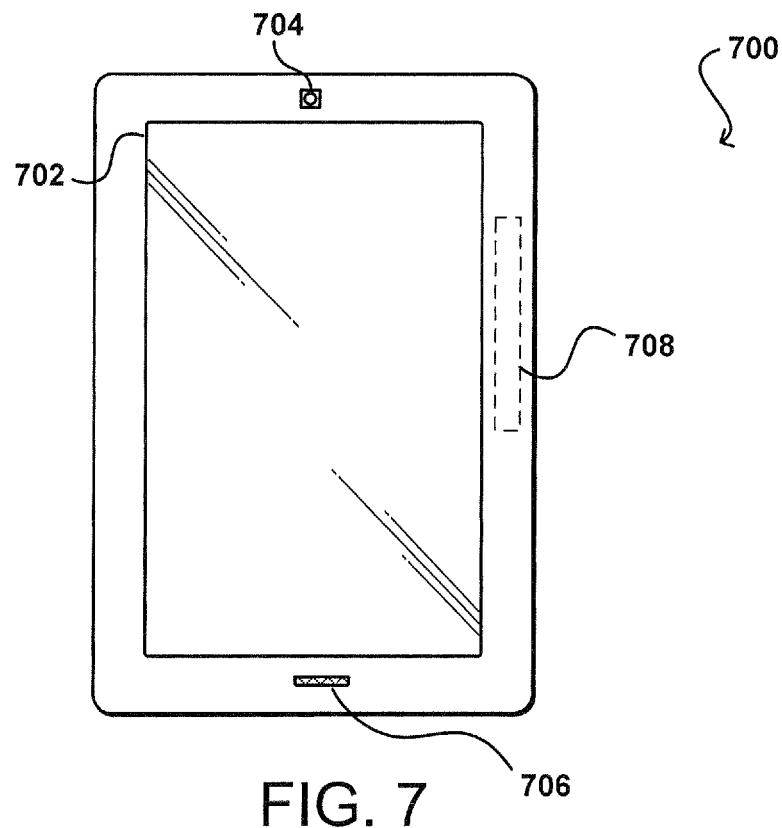
FIG. 7 illustrates an example electronic user device that can be used in accordance with various embodiments.

FIG. 7 illustrates an example electronic user device 700 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In this example, the computing device 700 has a display screen 702 on the front side, which under normal operation will display information to a user facing the display screen (e.g., on the same side of the computing device as the display screen). The computing device in this example includes at least one camera 704 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video.

The example computing device 700 also includes at least one microphone 706 or other audio capture device capable of capturing audio data, such as words or commands spoken by a user of the device. In this example, a microphone 706 is placed on the same side of the device as the display screen 702, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc.

The example computing device 700 also includes at least one orientation sensor 708, such as a position and/or movement-determining element. Such a sensor can include, for example, an accelerometer or gyroscope operable to detect an orientation and/or change in orientation of the computing device, as well as small movements of the device. An orientation sensor also can include an electronic or digital compass, which can indicate a direction (e.g., north or south) in which the device is determined to be pointing (e.g., with respect to a primary axis or other such aspect). An orientation sensor also can include or comprise a global positioning system (GPS) or similar positioning element operable to determine relative coordinates for a position of the computing device, as well as information about relatively large movements of the device. Various embodiments can include one or more such elements in any appropriate combination. As should be understood, the algorithms or mechanisms used for determining relative position, orientation, and/or movement can depend at least in part upon the selection of elements available to the device.

Figure 8:
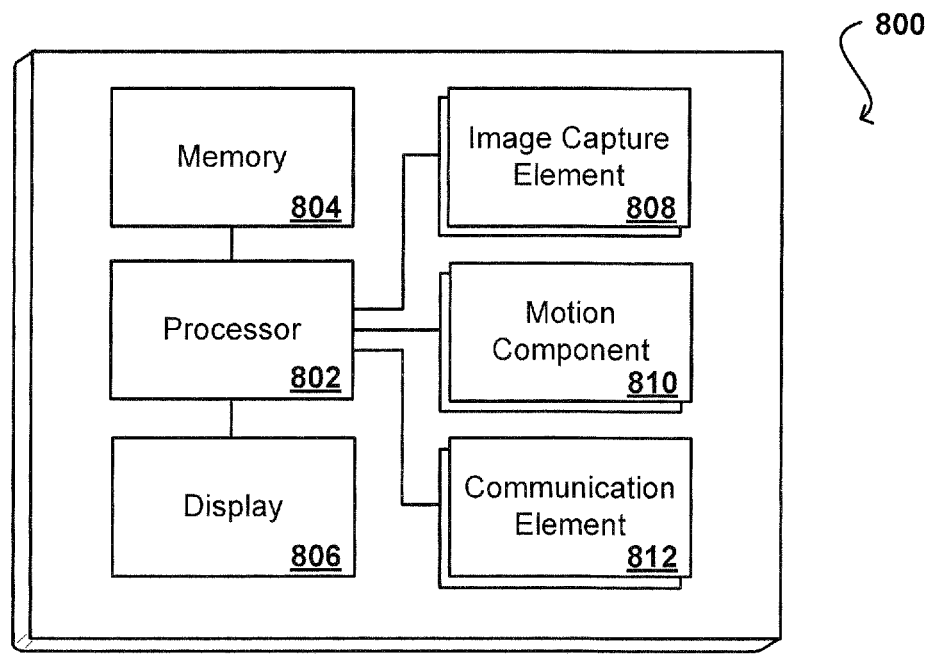
FIG. 8 illustrates a logical arrangement of a set of general components of an example computing device such as the device described with respect to FIG. 7.

FIG. 8 illustrates a logical arrangement of a set of general components of an example computing device 800 such as the device 700 described with respect to FIG. 7. In this example, the device includes a processor 802 for executing instructions that can be stored in a memory device or element 804. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device typically will include some type of display element 806, such as a touch screen or liquid crystal display (LCD), although devices such as portable media players might convey information via other means, such as through audio speakers. As discussed, the device in many embodiments will include at least one image capture element 808 such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc.

Further, a device can include the ability to start and/or stop image capture, such as when receiving a command from a user, application, or other device. The example device similarly includes at least one audio capture component (not shown), such as a mono or stereo microphone or microphone array, operable to capture audio information from at least one primary direction. A microphone can be a uni- or omni-directional microphone as known for such devices.

In some embodiments, the computing device 800 of FIG. 8 can include one or more communication elements 812, such as a Wi-Fi, Bluetooth®, radio frequency (RF), wired, or wireless communication system. The device in many embodiments can communicate with a network, such as the Internet, and may be able to communicate with other such devices. In some embodiments the device can include at least one additional input device able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 800 also can include at least one orientation or motion sensor 810. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 802, whereby the device can perform any of a number of actions described or suggested herein.

As an example, a computing device such as that described with respect to FIG. 7 can capture and/or track various information for a user over time. This information can include any appropriate information, such as location, actions (e.g., sending a message or creating a document), user behavior (e.g., how often a user performs a task, the amount of time a user spends on a task, the ways in which a user navigates through an interface, etc.), user preferences (e.g., how a user likes to receive information), open applications, submitted requests, received calls, and the like. As discussed above, the information can be stored in such a way that the information is linked or otherwise associated whereby a user can access the information using any appropriate dimension or group of dimensions.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python, or TCL, as well as combinations thereof. The server(s) may also include database servers, including without limitation those commercially available from Oracle®, Microsoft®, Sybase®, and iBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system for dynamic placement of advertisements, the system comprising:
   a processor; and
   a memory device including instructions that, when executed by a processor, cause the system to:
      obtain coordinate information for a touch location that corresponds to a place where a user touches a display area of an application to provide input to the application;
      obtain one or more advertisements associated with a service that is contextually relevant to the application;
      determine a size for a preview window based on an amount of available area surrounding the touch location, wherein the amount of available area represents at least a portion of the display area present between the touch location and a boundary of the display area;
      determine a position for the preview window with respect to the touch location based at least in part on the coordinate information of the touch location and the amount of available area surrounding the touch location; and provide for display the preview window in the determined size at a location corresponding to the determined position around the touch location, the preview window containing the one or more advertisements.

2. The system of claim 1, wherein the instructions further cause the system to:

receive coordinate information of the display area;

compare the coordinate information of the touch location with the coordinate information of the display area to determine a difference in area for different locations around the touch location; and determine the size of the preview window for each of the different locations around the touch location based on respective differences in area.

3. The system of claim 1, wherein the instructions further cause the system to:

determine a plurality of available locations around the touch location;

determine the amount of available area at each of the plurality of available locations; and select one of the plurality of available locations when the amount of available area at the one of the plurality of available locations is greater than the amount of available area at remaining ones of the plurality of available locations, wherein the preview window is provided for display at the selected one of the plurality of available locations.

4. A computer-implemented method for dynamic placement of advertisements, comprising:

under control of one or more computer systems configured with executable instructions, obtaining coordinate information for a touch location that corresponds to a place where a user touches a display area of an application to provide input to the application;

obtaining content that is contextually relevant to the application;

determining placement and dimensions for a preview window based at least in part on the coordinate information of the touch location; and providing for display the preview window having the determined dimensions at a location corresponding to the determined placement around the touch location, the preview window containing the content that is contextually relevant to the application.

5. The computer-implemented method of claim 4, wherein the placement and dimensions for the preview window are determined based on an amount of available area within the display area of the application, and wherein the amount of available area represents at least a portion of the display area present between the touch location and a boundary of the display area.

6. The computer-implemented method of claim 5, wherein determining the dimensions for the preview window comprises setting the preview window to a maximum size, and wherein the size of the preview window is reduced proportionate to the amount of available area when the maximum size is greater than the amount of available area.

7. The computer-implemented method of claim 6, wherein an aspect ratio of the preview window is kept constant when the preview window is reduced from the maximum size to an adjusted size.

8. The computer-implemented method of claim 4, wherein determining the placement for the preview window comprises:

setting the preview window to a centrally-aligned position with respect to the touch location; and determining if at least a portion of the preview window in the centrally-aligned position extends beyond a specified edge of the display area; and adjusting the preview window from the centrally-aligned position to a different position with the preview window being positioned adjacent to the specified edge of the display area when the at least a portion of the preview window at the centrally-aligned position is determined to extend beyond the specified edge of the display area.

9. The computer-implemented method of claim 4, wherein the placement and dimensions for the preview window are determined based on an orientation of an electronic device that comprises the computer-implemented method.

10. The computer-implemented method of claim 4, wherein the placement and dimensions for the preview window are determined based on a density of the display area of the application.

11. The computer-implemented method of claim 4, wherein providing for display the preview window comprises providing for display an overlay, wherein the preview window is included in the overlay.

12. The computer-implemented method of claim 4, wherein determining the placement for the preview window comprises comparing the at least the coordinate information of the touch location with one or more edges of the display area.

13. The computer-implemented method of claim 4, further comprising:

determining an amount of available area for a plurality of locations around the touch location;

determining a preview window for respective ones of the plurality of locations, each of the preview windows having a specified size up to the amount of available area in the respective location; and selecting one of the preview windows having a specified size that is greater than the specified size of the preview windows at remaining ones of the plurality of locations.

14. The computer-implemented method of claim 13, wherein selecting one of the preview windows comprises selecting one of the preview windows in a specified sequence of positions with respect to the touch location when more than one of the preview windows have an equivalent specified size that is greater than the specified size of the preview windows at the remaining ones of the plurality of locations.

15. The computer-implemented method of claim 13, further comprising providing for display the selected one of the preview windows, wherein the selected one of the preview windows includes an indicator at an edge of the preview window that is adjacent to the touch location, and wherein the indicator is generated based on the location of the preview window with respect to an edge of a selection element included in the touch location.

16. The computer-implemented method of claim 15, further comprising generating the indicator at a location on the edge of the preview window that is centrally aligned with the edge of the selection element that faces the preview window.

17. A non-transitory computer readable storage medium storing instructions for dynamic placement of advertisements for presentation in an application of an electronic device, the instructions when executed by a processor causing the processor to:
- obtain coordinate information for a touch location that corresponds to a place where a user touches a display area of an application to provide input to the application;
- obtain content that is contextually relevant to the application;
- determine placement and dimensions for a preview window based at least in part on the coordinate information of the touch location; and
- provide for display the preview window having the determined dimensions at a location corresponding to the determined placement around the touch location, the preview window containing the content that is contextually relevant to the application.

18. The non-transitory computer readable storage medium of claim 17, wherein the instructions further cause the processor to:
- set the preview window to a position centrally-aligned position with respect to the touch location; and
- determine if at least a portion of the preview window in the centrally-aligned position extends beyond a specified edge of the display area; and
- adjust the preview window from the centrally-aligned position to a different position where the preview window is positioned adjacent to the specified edge of the display area when the at least a portion of the preview window at the centrally-aligned position is determined to extend beyond the specified edge of the display area.

19. The non-transitory computer readable storage medium of claim 17, wherein the instructions further cause the processor to set the preview window to a maximum size, and wherein the size of the preview window is decreased proportionate to the amount of available area when the maximum size is greater than the amount of available area.

20. The non-transitory computer readable storage medium of claim 17, wherein the instructions further cause the processor to:
- determine an amount of available area for a plurality of locations around the touch location;
- determine a preview window for respective ones of the plurality of locations, each of the preview windows having a specified size up to the amount of available area in the respective location; and
- select one of the preview windows having a specified size that is greater than the specified size of the preview windows at remaining ones of the plurality of location.

* * * * *